United States Patent
Chang et al.

(10) Patent No.: US 7,117,116 B2
(45) Date of Patent: Oct. 3, 2006

(54) METHOD AND SYSTEM FOR CUTTING POINT CLOUD AUTOMATICALLY

(75) Inventors: Chih-Kuang Chang, Tu-Cheng (TW);
Xin-Yuan Wu, Shenzhen (CN);
Jie-Rong Chen, Shenzhen (CN);
Xiao-Dan Tang, Shenzhen (CN)

(73) Assignees: Hong Fu Jin Precision Industry Co., Ltd., Shenzhen (CN); Hon Hai Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/150,988

(22) Filed: Jun. 13, 2005

(65) Prior Publication Data
US 2006/0116838 A1   Jun. 1, 2006

(30) Foreign Application Priority Data
Nov. 26, 2004   (TW) ............... 93136471 A

(51) Int. Cl.
*G01F 15/00*   (2006.01)

(52) U.S. Cl. .................................. 702/153
(58) Field of Classification Search ............... 700/98; 702/153
See application file for complete search history.

(56) References Cited

U.S. PATENT DOCUMENTS 5,621,648 A * 4/1997 Crump ................. 700/112
6,738,727 B1   5/2004 Chang
2001/0040573 A1 * 11/2001 Kressin ................ 345/421
2002/0059042 A1 * 5/2002 Kacyra et al. .......... 702/152
2004/0254758 A1 * 12/2004 Chang ................. 702/155
2005/0018901 A1 * 1/2005 Kaufmann et al. ........ 382/154

FOREIGN PATENT DOCUMENTS

TW   569150   1/2004

\* cited by examiner

*Primary Examiner*—John Barlow
*Assistant Examiner*—Cindy D. Khuu
(74) *Attorney, Agent, or Firm*—Morris Manning & Martin; Tim Tingkang Xia, Esq.

(57) ABSTRACT

A system for cutting point cloud automatically includes an application server (1), client computers (3), and a database (5). The application server includes: a point cloud inputting module (10) for obtaining point cloud data and constructing an electronic figure according to the point cloud data; a figure changing module (11) for changing positions or views of the figure in the three-dimensional space; a point cloud cutting module (12) for cutting the point cloud automatically by executing a preestablished program; and a storing module (13) for storing the preestablished program and the point cloud after having been cut. A related method is also disclosed.

8 Claims, 6 Drawing Sheets

METHOD AND SYSTEM FOR CUTTING POINT CLOUD AUTOMATICALLY

BACKGROUND OF THE INVENTION

1. Field of the Invention

The present invention relates to point cloud editing systems and methods, and more particularly to a system and method for cutting point cloud automatically via Computer Aided Verification (CAV).

2. General Background

Product quality has long been one of the most important factors in maintaining a typical manufacturing enterprise's competitiveness. How to improve the quality of products is an important ongoing pursuit of such enterprise. It is essential to verify the correctness and accuracy of components of various assembled products. With more and more manufactured products becoming increasingly complex, the burden of verification is growing correspondingly. There is now a burgeoning need to verify components of products rapidly and precisely. Nevertheless, many enterprises still perform verification by employing numerous manual tasks and test programs that are non-standard. This can slow down output, and can seriously affect the accuracy and consistency of the verification performed.

In recent years, with the performance of computer hardware and software continually improving and with the prices of such equipment becoming more competitive, computers play a major role in the process of verification. Computer equipment can greatly improve the efficiency and accuracy of verification. This can be done by using a scan apparatus to scan an object to be verified, in order to obtain a plurality of discrete points commonly called point cloud. The point cloud can be inputted to the computer to form an electronic figure of the object. With analyzing and processing the point cloud data by executing particular software, the object will be verified. The art of analyzing and processing data on an object is disclosed in patents such as U.S. Pat. No. 6,738,727, entitled System and Methods for Analyzing and Processing data on an object. This invention can automatically measure the object and be help to guide production by comparing the measurement data with the design data. The system comprises an automatic scanning and measuring subsystem for obtaining point cloud data by scanning the object and generating measurement data on the object by processing the point cloud data.

Even though the system discloses how to obtain point cloud data, there are many littery points mixed in the point cloud, which would influence the processing speed and accuracy of the point cloud data. Current technology does not teach how to cut the jittery points automatically and user always has to cut them manually.

What is needed, therefore, is a system and method which can cut point cloud automatically and accurately.

SUMMARY

A system for cutting point cloud automatically in accordance with a preferred embodiment includes an application server, a plurality of client computers, and a database. The application server includes: a point cloud inputting module for obtaining point cloud data and constructing an electronic figure according to the point cloud data; a figure changing module for changing positions or views of the figure to obtain an optimum observing angle; a point cloud cutting module for cutting the point cloud automatically by executing a preestablished program, and a storing module for storing the preestablished program and the point cloud after having been cut. The figure changing module includes a position changing sub-module and a view changing sub-module. The position changing sub-module is used for changing a position of the figure in the three-dimensional space. The view changing sub-module is used for changing a view of the figure in the three-dimensional space. The point cloud cutting module includes a normal function sub-module and a mesh point cloud sub-module. The normal function sub-module is used for delimiting the point cloud area to be cut with a polygon and choosing to keep which parts of the polygon. The mesh point cloud sub-module is used for generating extra points on the edge of the polygon and choosing to cut the visible patch of the point cloud.

A method for cutting point cloud automatically in accordance with another preferred embodiment includes the steps of: obtaining point cloud data from a database; constructing an electronic figure according to the point cloud data; determining whether to cut the point cloud automatically; determining whether a preestablished program for cutting such kind of point cloud exists in a storing module if determining to cut the point cloud automatically; invoking the preestablished program to cut the point cloud automatically if such preestablished program exists; storing the point cloud.

Other advantages and novel features of the present invention will become more apparent from the following detailed description of preferred embodiments when taken in conjunction with the accompanying drawings, in which:

DETAILED DESCRIPTION OF THE INVENTION

Figure 1:
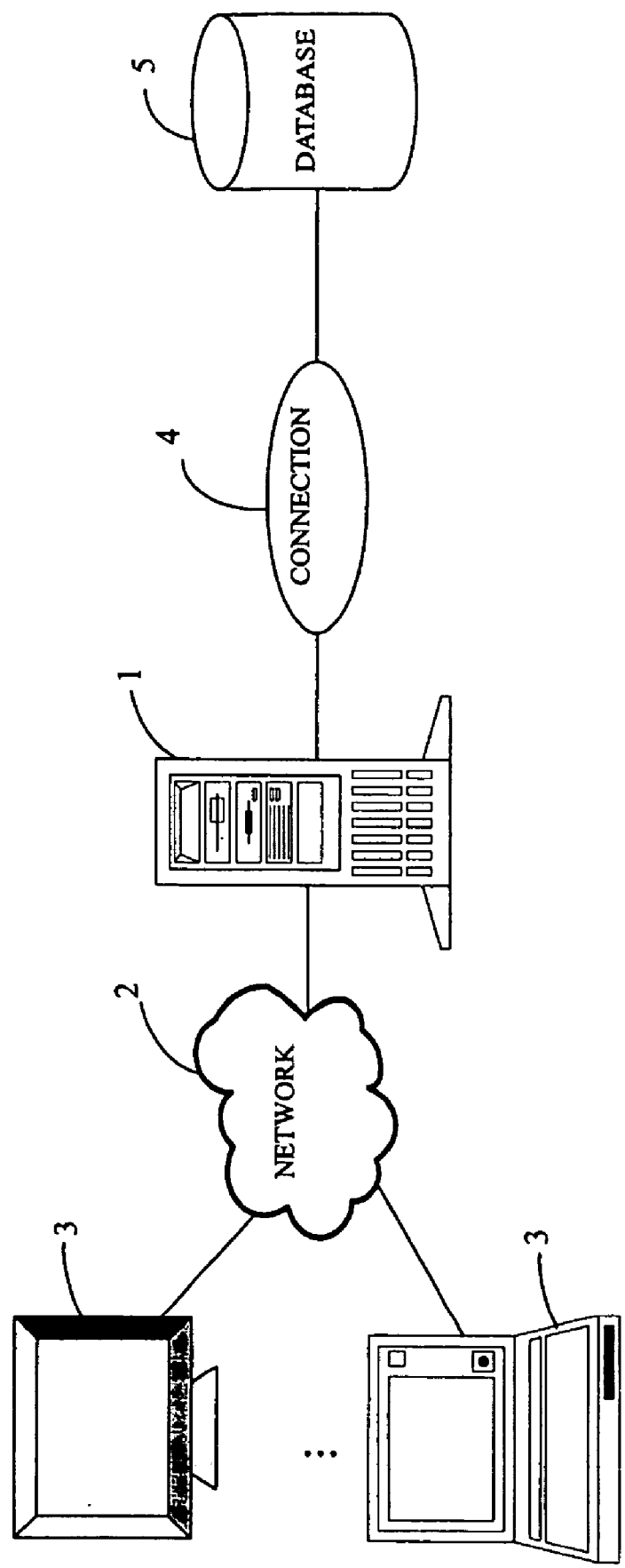
FIG. 1 is a schematic diagram of hardware configuration of a system for cutting point cloud automatically in accordance with a preferred embodiment of the present invention.

FIG. 1 is a schematic diagram of hardware configuration of a system for cutting point cloud automatically (hereinafter, "the system") in accordance with a preferred embodiment of the present invention. The system includes an application server 1, a plurality of client computers 3 (only two shown), and a database 5. The application server 1 communicates with the client computers 3 via a network 2. The network 2 may be an intranet, the Internet, or any other suitable type of communications link. The application server 1 is connected with the database 5 via a connection 4. The connection 4 is a database connectivity, such as an ODBC (Open Database Connectivity) or a JDBC (Java Database Connectivity).

The application server 1 is used for obtaining point cloud data, and cutting the point cloud. The application server 1 has had a plurality of software function modules installed therein for processing the point cloud. The client computers 3 are located at various internal departments of an organization operating the system. Users in the organization can access the application server 1 via any of the client computers 3, and obtain results of processing the point cloud. The database 5 is provided for storing the point cloud data. The point cloud data are obtained by scanning physical objects by a scan apparatus (not shown) connected to a client computer 3, such as a laser scanner, a coordinate measuring machine or an x-ray scanner, and are converted into a computer-recognizable format such as a text format. The point cloud data stored in the database 5 are expressed in the form of character strings.

Figure 2:
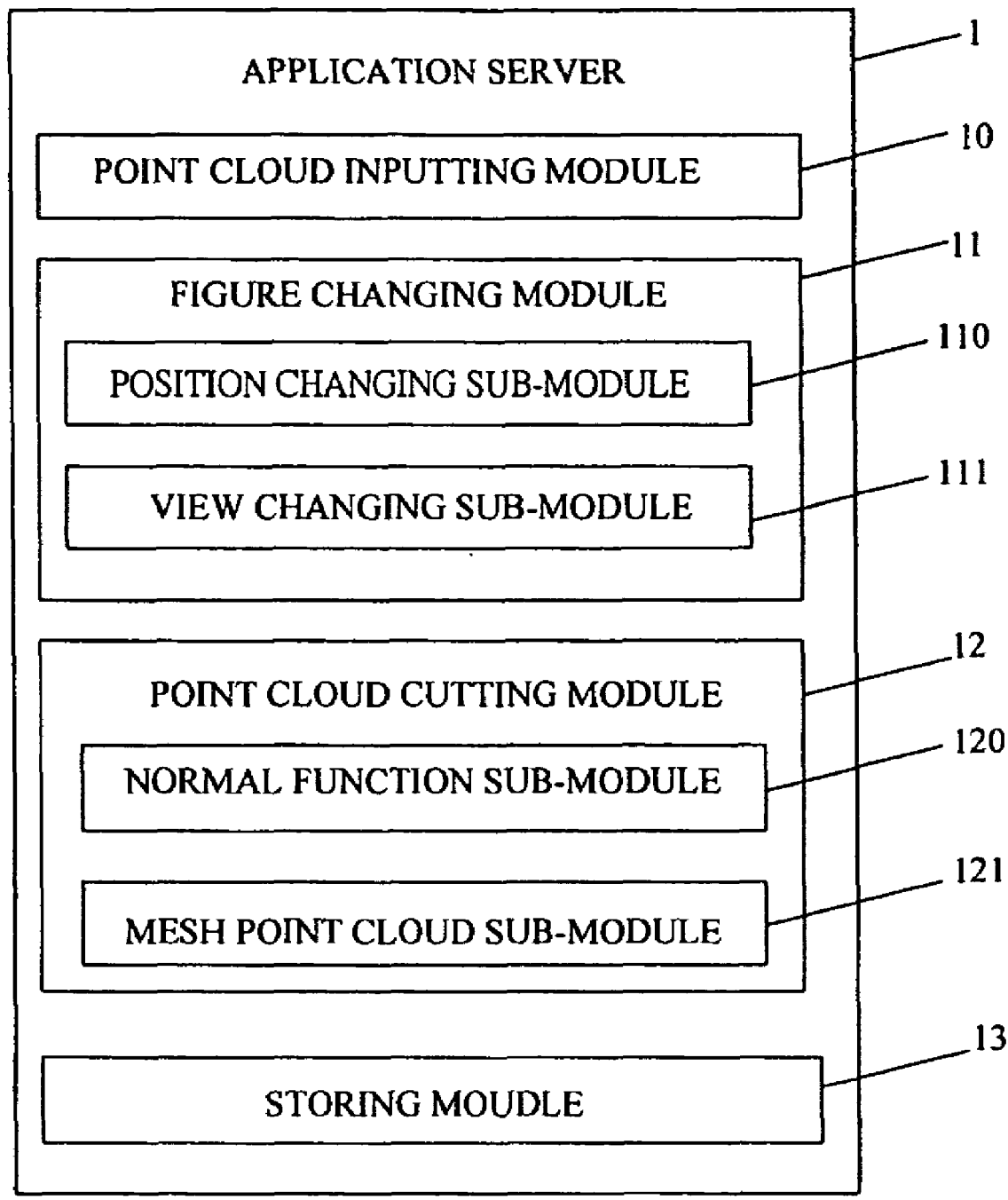
FIG. 2 is a schematic diagram of main software function modules of the application server of FIG. 1.

FIG. 2 is a schematic diagram of main software function modules of the application server 1. The application server 1 includes a point cloud inputting module 10, a figure changing module 11, a point cloud cutting module 12, and a storing module 13.

The point cloud inputting module 10 is used for obtaining point cloud, data from the database 5 or any client computer 3. The point cloud inputting module 10 is also used for constructing an electronic figure according to the point cloud data and displaying the figure on a display of any client computer 3.

The figure changing module 11 includes a position changing sub-module 110 and a view changing sub-module 111. The position changing sub-module 110 is used for changing a position of the figure in the three-dimensional space. Such change can be any one or more of the following: rotating the point cloud about an X-axis, rotating the point cloud about a Y-axis, rotating the point cloud about a Z-axis, moving the point cloud parallel to the X-axis, moving the point cloud parallel to the Y-axis, moving the point cloud parallel to the Z-axis, and zooming in and zooming out according to proportion. The view changing sub-module 111 is used for changing a view of the figure in the three-dimensional space. The view to the point cloud can be any one of a top view, a bottom view, a right side view, a left side view, a front view, a rear view, and so on. The main objective of changing a position or a view of the figure is to obtain an optimum observing angle, in order to cut the point cloud more accurately.

The point cloud cutting module 12 includes a normal function sub-module 120 and a mesh point cloud sub-module 121 (described in detail below in relation to FIG. 3). A user may choose to cut the point cloud automatically or manually via this module. When the user chooses to cut the point cloud automatically, the application server 1 first searches in the storing module 13 to determine whether a preestablished program for cutting such kind of point cloud exists. If such preestablished program exists in the storing module 13, the user may invoke the preestablished program. Then, the point cloud can be cut automatically. The storing module 13 is used for storing the preestablished program and the point cloud after having been cut.

Figure 3:
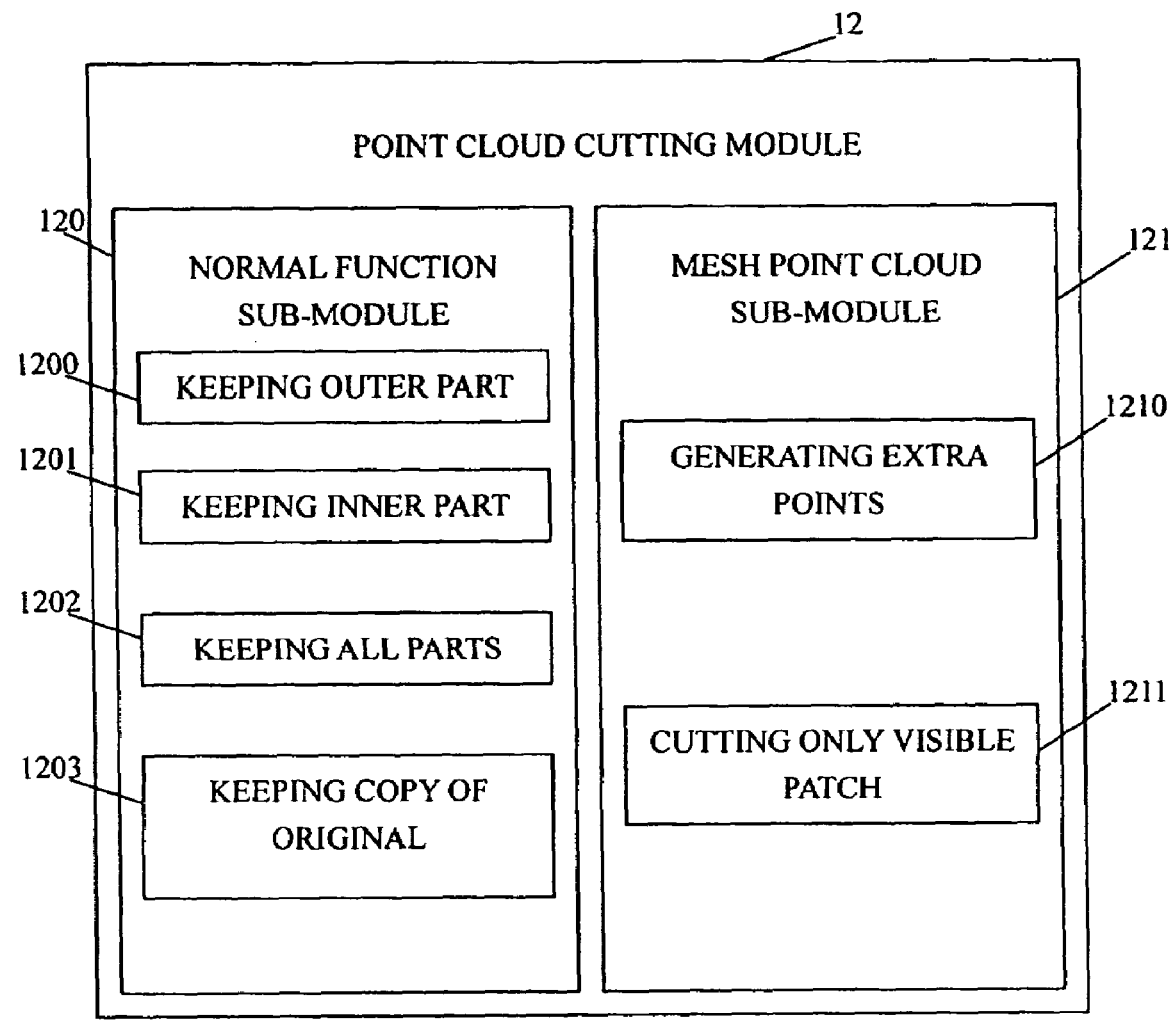
FIG. 3 is a schematic diagram showing functions of the point cloud cutting module of the application server of FIG. 2.

FIG. 3 is a schematic diagram showing functions of the point cloud cutting module 12. The point cloud cutting module 12 includes a normal function sub-module 120 and a mesh point cloud sub-module 121. The normal function sub-module 120 mainly performs the following functions: keeping outer part 1200; keeping inner part 1201; keeping all parts 1202; and keeping copy of original 1203. After determining a point cloud area that needs to be cut, the user may delimit the point cloud area with a polygon, and choose to cut inner parts of the polygon by using the function of keeping outer part 1200 or cut outer parts of the polygon by using the function of keeping inner part 1201. The user may also choose to keep all parts of the polygon and divide the point cloud into two separate parts with the function of keeping all parts 1202, in order that the user may choose one part of the point cloud to cut. The user may further copy the point cloud before cutting with the function of keeping copy of original 1203, in order to generate point cloud templates for future use. The mesh point cloud sub-module 121 performs two functions: generating extra points 1210 and cutting only visible patch 1211. Because the distribution of the point cloud may be asymmetric, the edge of the polygon after having been cut can be accidented. Using the function of generating extra points 1210, extra points can be generated along the accidented edge of the polygon to eliminate this defect. Using the function of cutting only visible patch 1211 can only cut visible patches of the point cloud.

Figure 4:
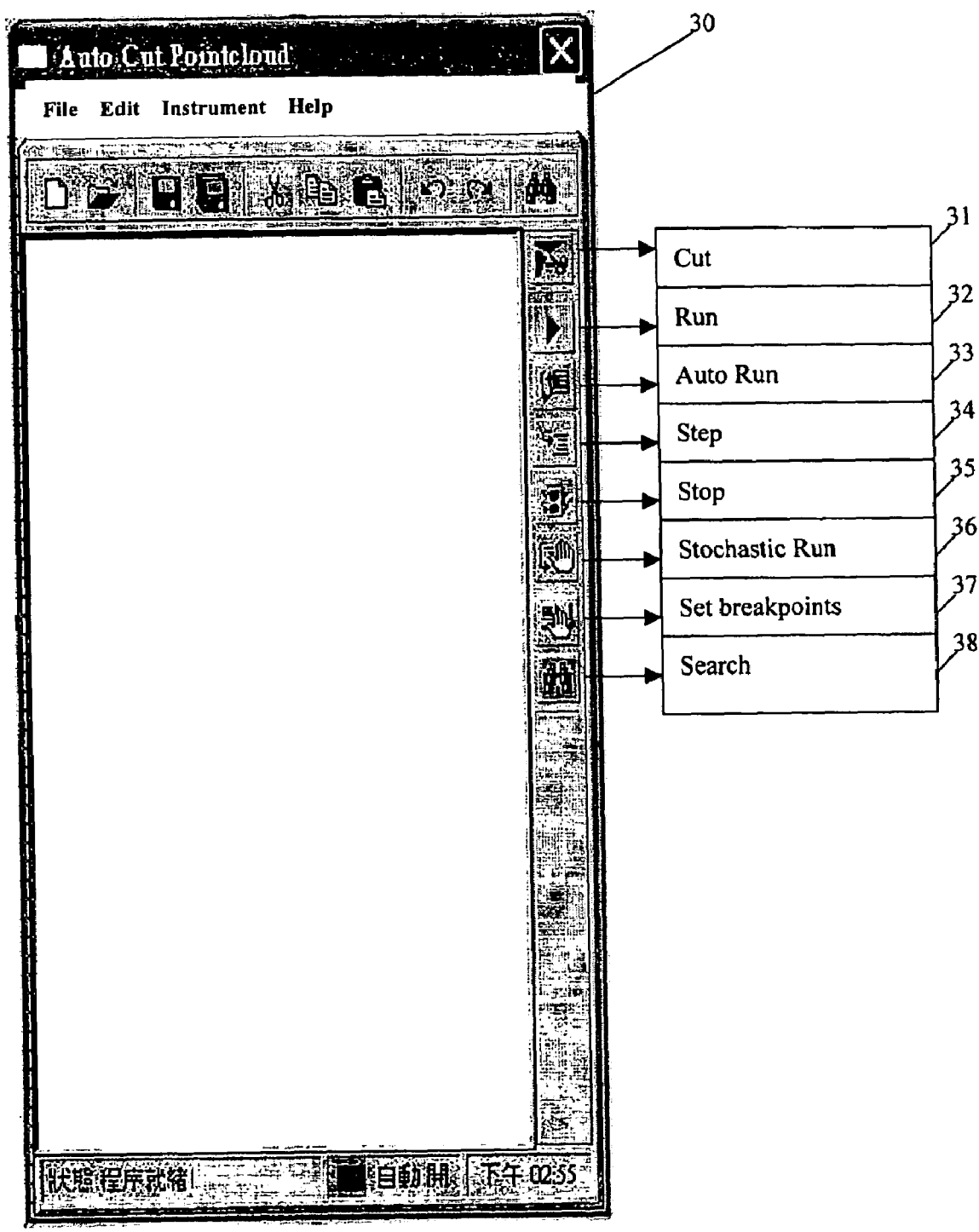
FIG. 4 is an operation interface for performing the system of FIG. 1.

FIG. 4 is an operation interface for performing the system. There is a main menu 30 on the top of the interface including four items: File, Edit, Instrument and Help. Eight function icons are arranged at the right of the interface, each of which performs a main function of the system. Cut 31 is used for cutting point cloud manually. The storing module 13 records the whole cutting process and generates a preestablished program, which can be invoked to automatically cut the same kind of point cloud when necessary. Run 32 is used for executing a particular preestablished program to automatically cut point cloud. If any breakpoint has been set in the preestablished program, the preestablished program pauses at the breakpoint during the execution process. Breakpoints are instructions to the debugger that when a particular line of code is ready to be executed, the program should stop, which allows users to run the program unimpeded until the line in question is reached. Breakpoints help the users analyze the current condition of variables just before and after a critical line of code. Auto Run 33 is used for executing a preestablished program automatically. By using this function, the preestablished program does not pause even when the program runs to a breakpoint. Step 34 is used for executing a preestablished program step by step, which can help to check source codes of the program and analyze the preestablished program detailedly. Stop 35 is used for stopping running of a preestablished program. Stochastic Run 36 is used for cutting a point cloud area stochastically. Set breakpoints 37 is used for setting breakpoints in a preestablished program. Search 38 is used for searching a corresponding preestablished program for cutting a kind of point cloud.

Figure 5:
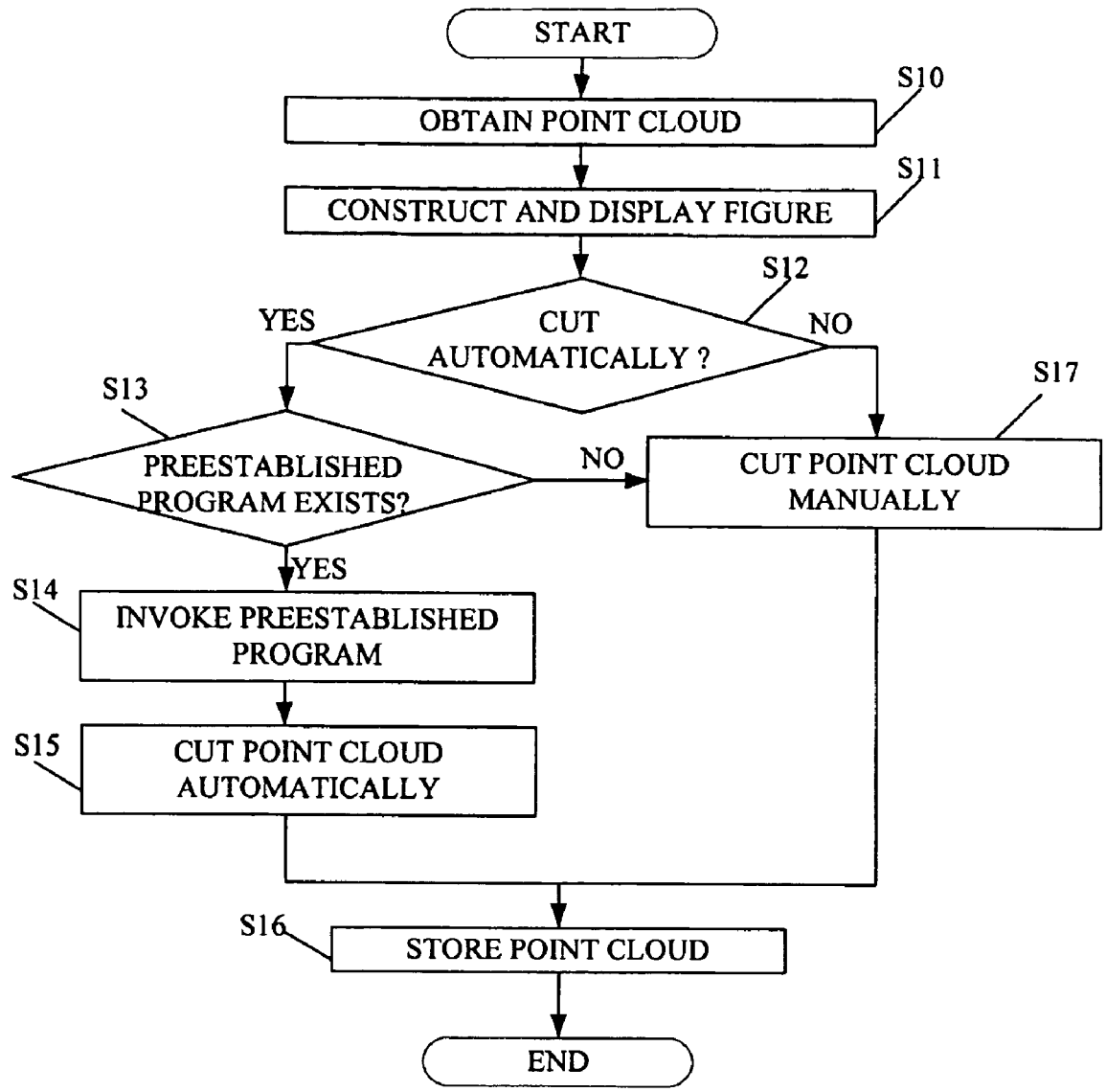
FIG. 5 is a flowchart of a method for cutting point cloud automatically in accordance with a preferred embodiment of the present invention.

FIG. 5 is a flowchart of a method for cutting point cloud automatically in accordance with a preferred embodiment of the present invention. In step S10, the point cloud inputting module 10 obtains point cloud data from the database 5. In step S11, the point cloud inputting module 10 constructs an electronic figure according to the point cloud data, and displays the figure on an output device of a client computer 3. In step S12, a user determines whether to cut the point cloud automatically. If the user chooses to cut the point cloud manually by pressing the function icon Cut 31, the procedure goes directly to step S17. The user cuts the point cloud manually via the point cloud cutting module 12 (described in detail in relation to FIG. 6). Otherwise, if the user chooses to cut the point cloud automatically by pressing the function icon Auto Run 33, in step S13, the application server 1 searches in the storing module 13 to determine whether a preestablished program for cutting such kind of point cloud exists. If no corresponding preestablished program exists in the storing module 13, the procedure goes directly to step S17. Otherwise, if there is a preestablished program in the storing module 13, in step S14, the point cloud cutting module 12 invokes the preestablished program. In step S15, the point cloud cutting module 12 executes the preestablished program to cut the point cloud automatically. In step S16, the storing module 13 stores the point cloud after having been cut.

Figure 6:
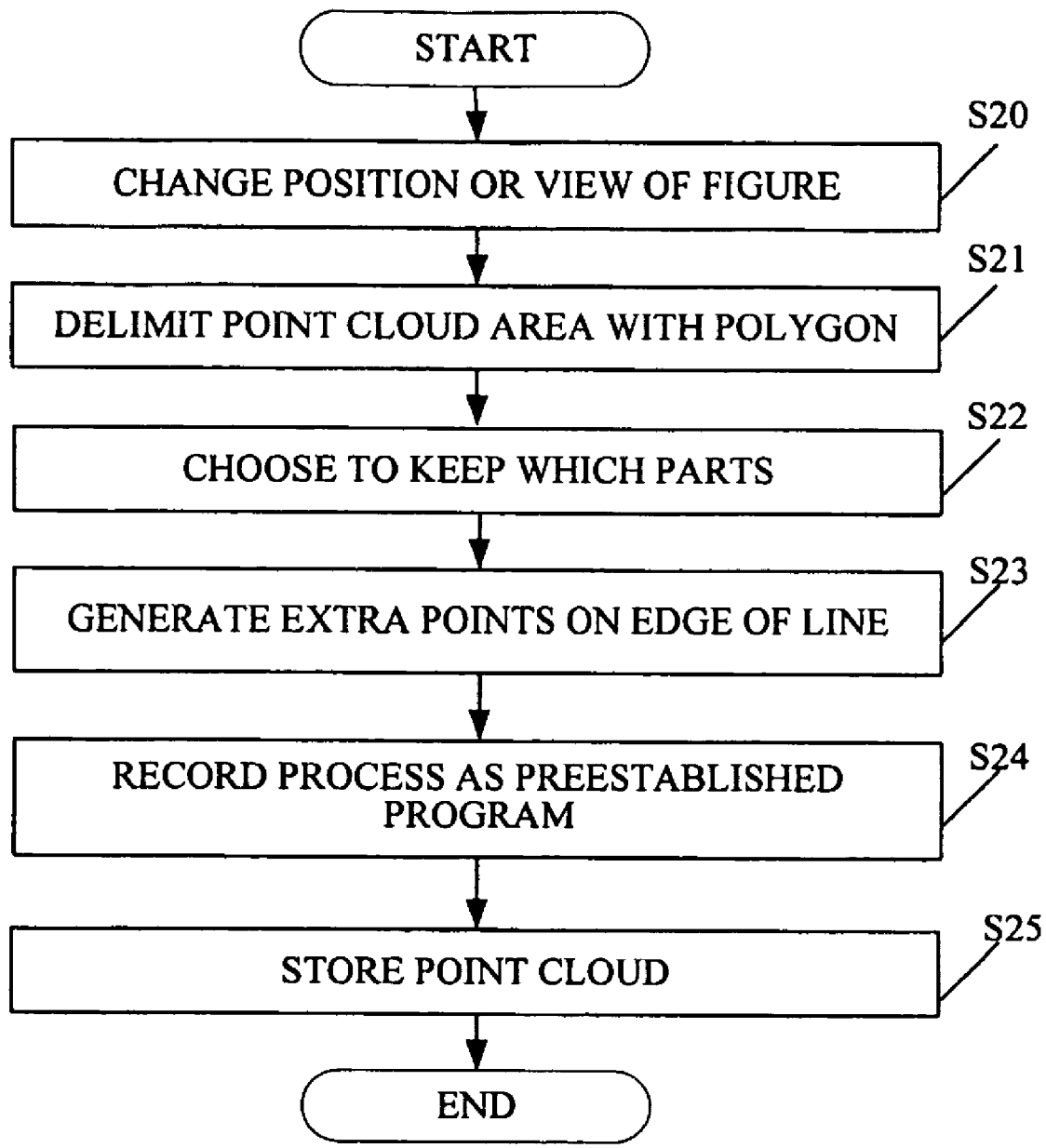
FIG. 6 is a flowchart of a method for cutting point cloud manually in accordance with a preferred embodiment of the present invention.

FIG. 6 is a flowchart of details of step S17, namely, cutting the point cloud manually. In step S20, the figure changing module 11 changes positions or views of the figure in the three-dimensional space to obtain an optimum observing angle, so that the point cloud can be cut more accurately. In step S21, the user delimits the point cloud area to be cut with a polygon. In step S22, the user chooses to keep which parts of the polygon by using any one of the functions of the normal function sub-module 120 including: keeping inner part 1200, keeping outer part 1201, keeping all parts 1202, keeping copy of original 1203 and cutting only visible part 1211. In step S23, the mesh point cloud sub-module 121 generates extra points along the edge of the polygon after the point cloud has been cut. In step S24, the storing module 13 records the whole cutting process and all information generated during the cutting process including parameters of visual angles and coordinates of the point cloud area, and saves the record as a preestablished program. In step S25, the storing module 13 stores the point cloud after having been cut.

Although the present invention has been specifically described on the basis of a preferred embodiment and a preferred method, the invention is not to be construed as being limited thereto. Various changes or modifications may be made to said embodiment and method without departing from the scope and spirit of the invention.

We claim:

1. A system for cutting a point cloud automatically, the system comprising an application server, the application server comprising:
   a point cloud inputting module for obtaining a point cloud;
   a point cloud cutting module for cutting the point cloud automatically by executing a preestablished program, the point cloud cutting module comprising:
   a normal function sub-module for delimiting the point cloud area with a polygon, and for choosing to keep which parts of the polygon; and
   a mesh point cloud sub-module for generating extra points along the edge of the polygon, and for choosing to cut only a visible patch of the point cloud; and
   a storing module for storing the preestablished program and the point cloud after the point cloud has been cut.

2. The system as claimed in claim 1, wherein the point cloud inputting module is further used for constructing an electronic figure according to the obtained point cloud.

3. The system as claimed in claim 2, wherein the application server further comprises a figure changing module for changing positions or views of the electronic figure in three-dimensional space to obtain an optimum observing angle.

4. The system as claimed in claim 3, wherein the figure changing module comprises:
   a position changing sub-module for changing a position of the point cloud in the three-dimensional space; and
   a view changing sub-module for changing a view to the point cloud in the three-dimensional space.

5. A method for cutting a point cloud automatically, comprising the steps of:
   obtaining point cloud data from a database;
   constructing an electronic figure according to the point cloud data;
   determining whether to cut the point cloud automatically;
   determining whether a preestablished program for cutting such kind of point cloud exists in a storing module if the point cloud needs to be cut automatically;
   invoking the preestablished program to cut the point cloud automatically if such preestablished program exists; and
   storing the cut point cloud.

6. The method according to claim 5, wherein the step of determining whether a preestablished program exists comprises the step of cutting the point cloud manually if no preestablished program for cutting such kind of point cloud exists.

7. The method according to claim 6, wherein the step of cutting the point cloud manually comprises the steps of:
   changing positions or views of the figure in three-dimensional space;
   delimiting the point cloud area to be cut with a polygon;
   choosing to keep which parts of the polygon;
   generating extra points along the edge of the polygon;
   recording the whole cutting process and all information generated during the cutting process;
   saving the record as a preestablished program; and storing the point cloud.

8. A method for perfecting point cloud data automatically, comprising the steps of:
   retrieving said point cloud data;
   constructing a viewable figure formed according to said point cloud data;
   determining whether to cut said point cloud data automatically;
   initiating an available program for said perfecting of said point cloud data when said point cloud data need to be cut automatically;
   automatically removing identifiably undesired parts of said point cloud data therefrom for said perfecting; and
   saving said perfected point cloud data.

* * * * *